(12) United States Patent
Endres

(10) Patent No.: US 12,246,935 B1
(45) Date of Patent: Mar. 11, 2025

(54) ATTACHABLE GRIP HANDLE

(71) Applicant: Terry Endres, Fort Collins, CO (US)

(72) Inventor: Terry Endres, Fort Collins, CO (US)

(73) Assignee: Terry Endres, Fort Collins, CO (US)

( * ) Notice: Subject to any disclaimer, the term of this patent is extended or adjusted under 35 U.S.C. 154(b) by 0 days.

(21) Appl. No.: 18/799,838

(22) Filed: Aug. 9, 2024

(51) Int. Cl.
*B65G 7/12* (2006.01)

(52) U.S. Cl.
CPC ..................................... *B65G 7/12* (2013.01)

(58) Field of Classification Search
CPC ............... A45F 5/10; A45F 2005/1006; A45F 2005/1013; B65G 7/12
USPC ....... 294/145, 149, 150, 153, 154, 159, 165, 294/170
See application file for complete search history.

(56) References Cited

U.S. PATENT DOCUMENTS

| | | | |
|---|---|---|---|
| 181,492 A * | 8/1876 | Stevens | |
| 971,876 A * | 10/1910 | Apple | |
| 3,188,130 A * | 6/1965 | Pietrowicz | A22B 5/06 |
| | | | D22/199 |
| 4,658,999 A | 4/1987 | Hilty | |
| 4,678,221 A * | 7/1987 | Josenhans | A45F 5/10 |
| | | | 294/170 |
| 4,791,702 A * | 12/1988 | McVey | H01M 50/256 |
| | | | 294/154 |
| 5,282,555 A | 2/1994 | Muir et al. | |
| 5,752,733 A * | 5/1998 | Marshall | B63H 20/36 |
| | | | 294/157 |
| 6,602,015 B1 | 8/2003 | Evans et al. | |
| 7,350,437 B2 | 4/2008 | Mangano et al. | |
| 10,875,442 B1 | 12/2020 | Combs, Jr et al. | |
| 11,453,344 B2 | 9/2022 | Liu | |
| 2002/0008125 A1 | 1/2002 | Caputi | |
| 2006/0085949 A1* | 4/2006 | Udy | A45F 5/10 |
| | | | 16/428 |
| 2013/0062372 A1 | 3/2013 | Bradford | |
| 2014/0061274 A1 | 3/2014 | Huang et al. | |
| 2014/0339276 A1 | 11/2014 | Tyetyerin | |
| 2023/0416001 A1* | 12/2023 | Flaten | B65G 7/12 |

FOREIGN PATENT DOCUMENTS

| | | |
|---|---|---|
| BR | 202020002969 U2 | 8/2021 |
| CN | 104743036 A | 7/2015 |
| CN | 105916734 A | 8/2016 |
| WO | 2000021824 A1 | 4/2000 |

* cited by examiner

*Primary Examiner* — Dean J Kramer
(74) *Attorney, Agent, or Firm* — Ryan L. Marshall; Laine Cadwallader; Barnes & Thornburg LLP

(57) ABSTRACT

A handle assembly comprises a handle and a fastener. The handle includes a first end, a second end opposite the first end, and a passageway. The fastener includes a first connector, a second connector, and an elongate body. The elongate body of the fastener is configured to at least partially surround a first portion of a structure disposed, extend through the passageway of the handle, and at least partially surround a second portion of the structure. The fastener is configured to form a continuous loop by connecting the first connector to the second connector to fixedly positon the handle between the first portion of the structure and the second portion of the structure.

20 Claims, 5 Drawing Sheets

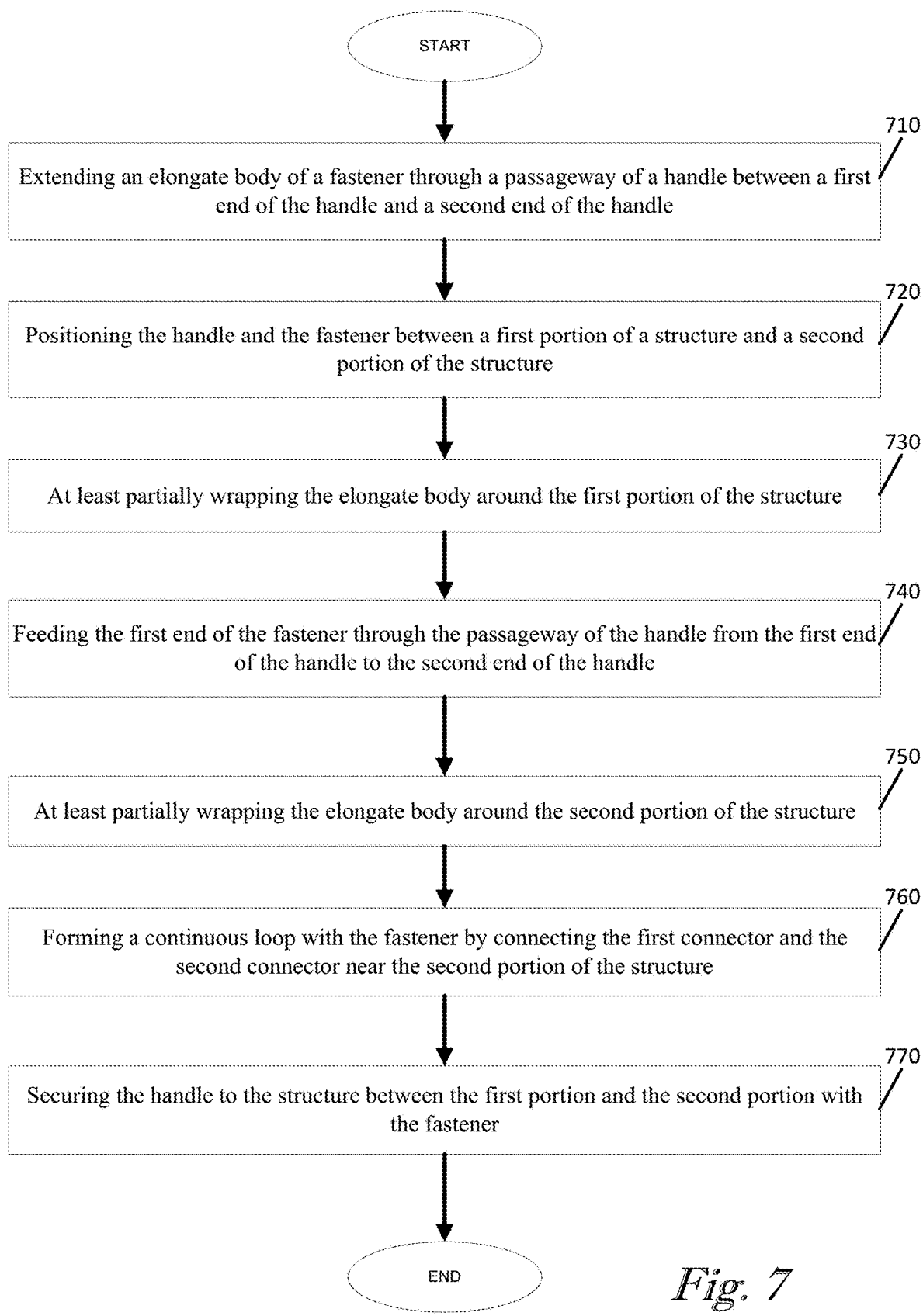

ATTACHABLE GRIP HANDLE

TECHNICAL FIELD

This disclosure relates to handle assemblies and, in particular, to carrying handles.

BACKGROUND

Present carrying handles suffer from a variety of drawbacks, limitations, and disadvantages. Accordingly, there is a need for inventive systems, methods, components, and apparatuses described herein.

SUMMARY

The present disclosure may comprise one or more of the following features and combinations thereof.

A handle assembly comprises a handle and a fastener. The handle includes a first end and a second end opposite the first end. The handle includes a passageway extending a length of the handle between the first end and the second end. The fastener includes a first connector, a second connector, and an elongate body extending between the first connector and the second connector.

In some embodiments, the elongate body of the fastener is configured to at least partially surround a first portion of a structure disposed near the first end of the handle, extend through the passageway of the handle, and at least partially surround a second portion of the structure disposed near the second end of the handle. The fastener is configured to form a continuous loop by connecting the first connector to the second connector near at least one of the first end or the second end of the handle. The fastener is configured to fixedly positon the handle between the first portion of the structure and the second portion of the structure. In some embodiments, the structure is a V-shaped structure.

In some embodiments, a rigidness and tolerance of the handle assembly is configured to quickly affect movement of the structure based on movement of the handle assemble without lag. A body of the handle may be cylindrical in shape, the passageway extending along an axis extending through a center of the handle and along the length of the handle. The elongate body of the fastener may extend substantially parallel to itself within the handle between the first portion of the structure and the second portion of the structure.

In some embodiments, a material of the handle is a polymer. The material for the handle may comprise at least one of polyethylene, polypropylene, polyurethane, or nylon. In some embodiments, the material of the fastener is a polymer.

In some embodiments, the first connector is a male portion of the fastener and the second connector is a female portion of the fastener. The fastener may be configured to form the continuous loop by inserting the male portion into the female portion. The fastener may be a cable tie.

In some embodiments, the fastener is configured to support the handle and a weight of the structure when the structure is lifted with the handle. A shape of the fastener may be configured to help the handle maintain a shape and a structure of the handle when the handle is fastened to the structure.

In some embodiments, the structure is a bicycle. The structure may include a down tube, a seat tube, and a top tube, the handle extending between the seat tube and the down tube. The handle may abut the structure at both ends of the handle.

A method of installing a handle assembly comprises extending an elongate body of a fastener through a passageway of a handle between a first end of the handle and a second end of the handle. The fastener includes a first connector disposed at a first end of the fastener and a second connector disposed at a second end of the fastener. The elongate body extends between the first connector and the second connector.

The method includes positioning the handle and the fastener between a first portion of a structure and a second portion of the structure. The first end of the handle and the first end of the fastener are disposed near the first portion of the structure and the second end of the handle and the second end of the fastener are disposed near the second portion of the structure.

The method includes at least partially wrapping the elongate body around the first portion of the structure. The method includes feeding the first end of the fastener through the passageway of the handle from the first end of the handle to the second end of the handle. The method includes at least partially wrapping the elongate body around the second portion of the structure;

The method includes forming a continuous loop with the fastener by connecting the first connector and the second connector near the second portion of the structure. The method includes securing the handle to the structure between the first portion and the second portion with the fastener.

In some embodiments, positioning the handle and the fastener between a first portion of a structure and a second portion of the structure comprises positioning the handle at a location where the distance between the first portion and the second portion is substantially equal to a length of the handle. Forming a continuous loop with the fastener by connecting the first connector and the second connector near the second portion of the structure may comprise feeding the second connector through the first connector. Securing the handle to the structure between the first portion and the second portion with the fastener may comprise adjusting the fastener to remove any gaps between the structure, the handle, and the fastener.

A handle assembly comprises a handle and a fastener. The handle includes a first end, a second end opposite the first end, and a passageway extending a length of the handle between the first end and the second end. The fastener includes a first connector, a second connector, and an elongate body extending between the first connector and the second connector.

The elongate body of the fastener is configured to at least partially surround a first portion of a V-shaped structure disposed near the first end of the handle, extend through the passageway of the handle, and at least partially surround a second portion of the V-shaped structure disposed near the second end of the handle. The fastener is configured to form a continuous loop by connecting the first connector to the second connector near at least one of the first end or the second end of the handle to fixedly positon the handle between the first portion of the V-shaped structure and the second portion of the V-shaped structure. The handle is held in place by a shape of the V-shaped structure and a fixed dimension of the continuous loop formed by the elongate body.

These and other features of the present disclosure will become more apparent from the following description of the illustrative embodiments.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

FIG. 7 illustrates a flow diagram of an example of method step to install the handle assembly on a structure.

DETAILED DESCRIPTION

Figure 1:
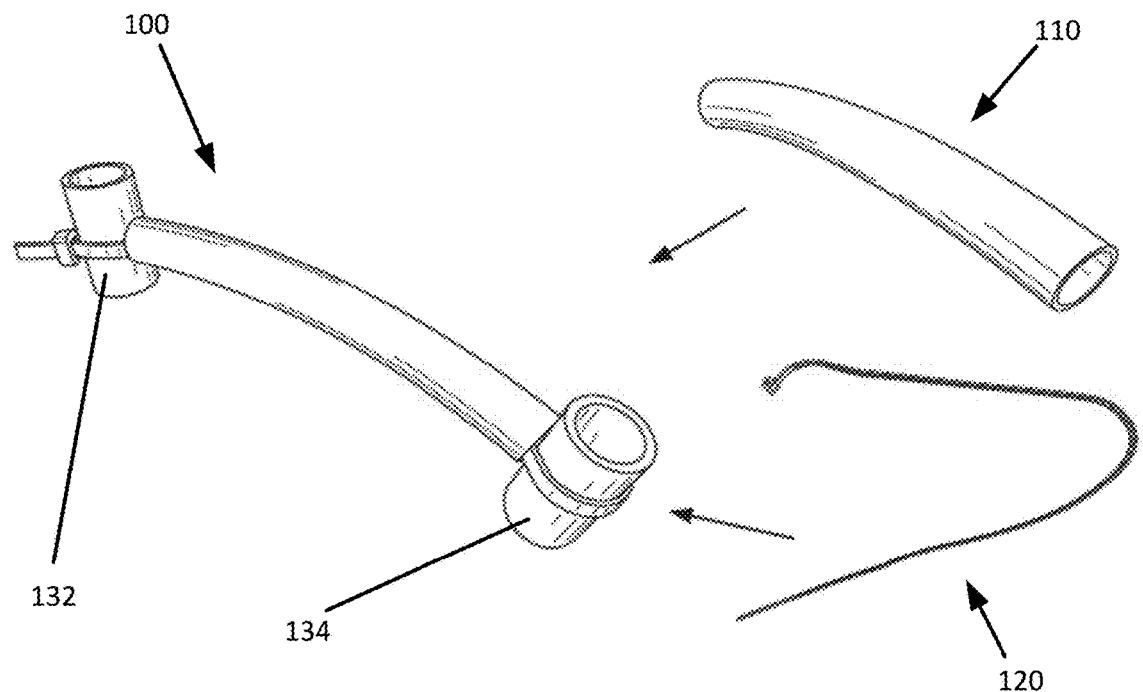
FIG. 1 illustrates an example of separate components of a handle assembly and the completed handle assembly and components in an installed configuration.
Figure 2:
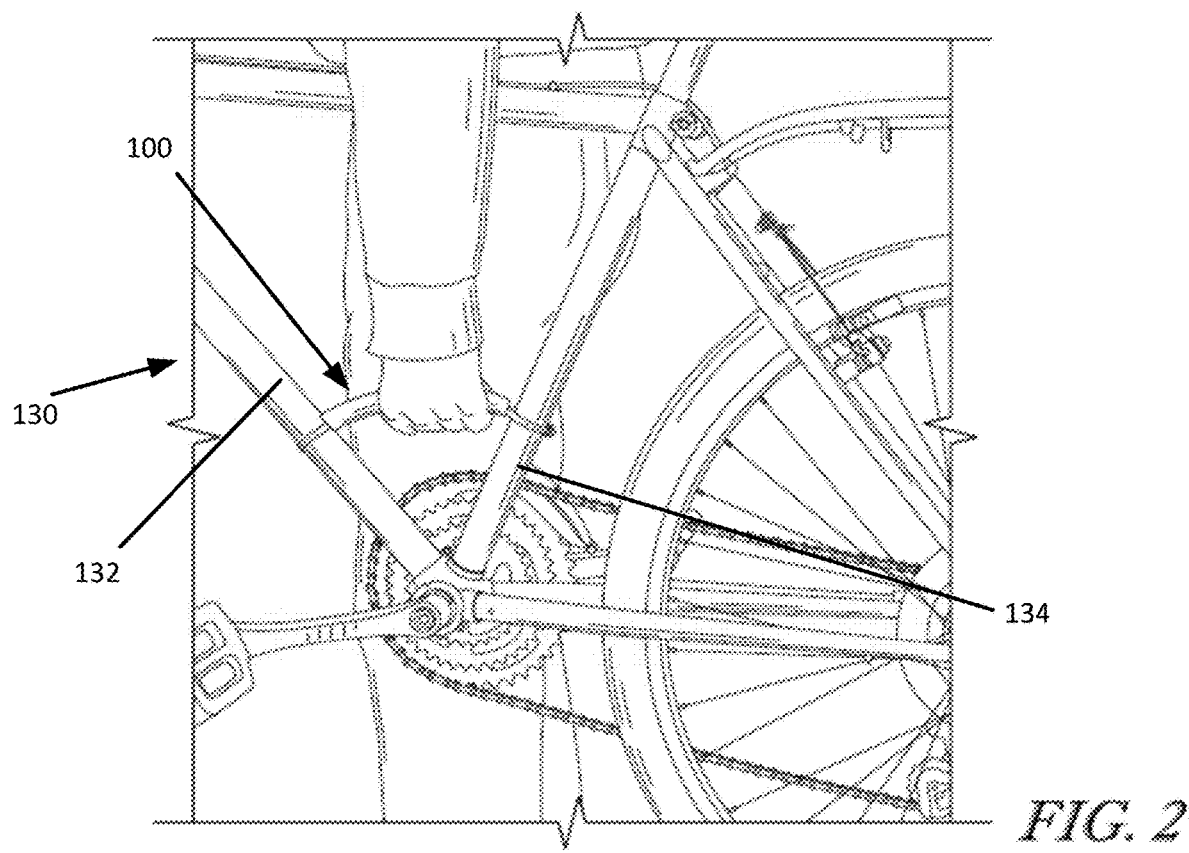
FIG. 2 illustrates an example of the carrying handle installed on a bicycle frame.

Turning now to FIGS. 1-7, a handle assembly 100 is provided. FIG. 1 shows an example of separates components 110, 120 of a handle assembly 100. The handle assembly 100 includes a handle 110 and a fastener 120. The handle 110 may be positioned on a structure 130, for example, between two portions 132, 134 of the structure 130. During installation, the fastener 120 may be looped through the handle 110 and around portions 132, 134 of the structure 130 to secure the handle 110 to the structure 130 in an installed configuration, as shown in FIGS. 1-2. In some embodiments, in the installed configuration, the handle 110 is fixedly positioned and held in place on the structure 130 by the fastener 120 and/or by the shape of the structure 130. In some embodiments, the handle assembly 100 enables relatively easier carrying, moving, and/or manipulation of the structure 130.

Figure 3:
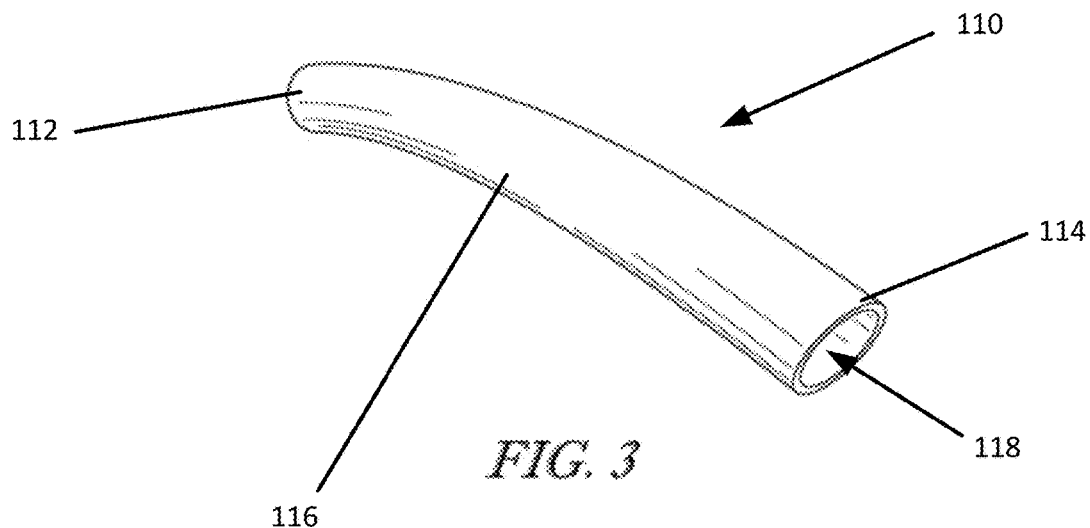
FIG. 3 illustrates a perspective view of an example of a handle component of the handle assembly of FIGS. 1-2.
Figure 4:
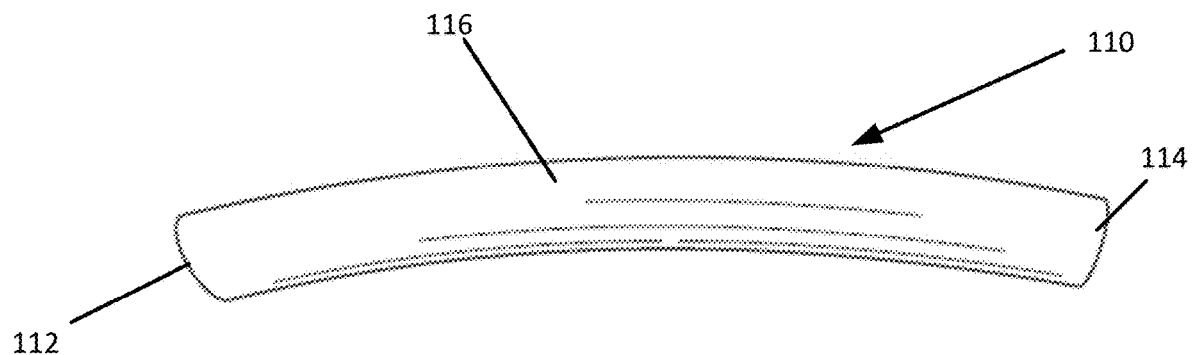
FIG. 4 illustrates a side view of the handle component of FIG. 3.
Figure 5:
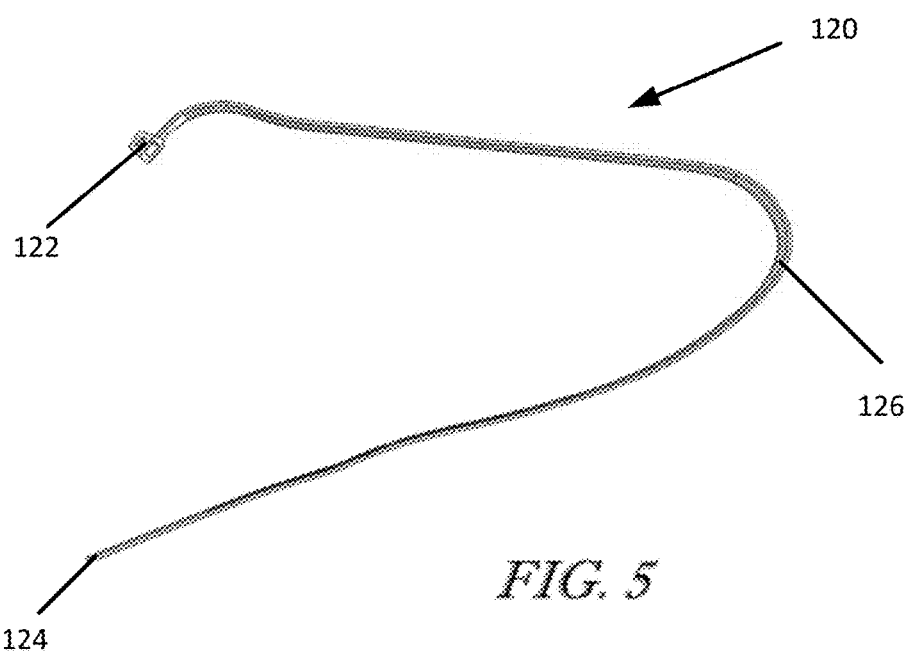
FIG. 5 illustrates a top view of an example of a fastener component of the handle assembly of FIGS. 1-2.

FIGS. 3-5 show detailed views of the handle 110 and fastener 120 components of the handle assembly 100. As shown in FIGS. 3 and 4, the handle 110 includes a first end 112, a second end 114, and an outer wall 116 forming a passageway 118 extending along a length of the handle 110 between the first and second ends 112, 114. As shown in FIGS. 1-4, the handle 110 is a tube and is cylindrical in shape, with the cylindrical-shaped outer wall 116 and passageway 118 extending between the first and second ends 112, 114. In other embodiments, the handle 110 may have cross section that is square, rectangular, oval, or any other suitable shape that allows for an internal passageway 118 and is suitable for griping and/or handling.

The handle 110 material may be any material that is firm and/or rigid enough to retain its shape and/or structure, provide a suitable handle able to carry the weight of the structure, and/or effect relatively quick movement of the structure 130 through movement of the handle 110. In some embodiments, the handle 110 material is a polymer. For example, the handle 110 material may comprise polyethylene, polypropylene, polyurethane, nylon, and/or any other suitable polymer or other material that provides a relatively rigid and stable carrying handle.

In some embodiments, the handle 110 and/or handle 110 material has a tensile strength of approximately 10,400 kPa (1,500 psi). The handle 110 and/or handle 110 material is able to withstand temperatures in the range of −73° C. and 80° C. (−100° F. and 175° F.). Additionally or alternatively, the handle 110 and/or the handle 110 material is FDA compliant, chemical resistance, impermeable to moisture or gases, and/or not impart taste or odors. Additionally or alternatively, the handle 110 and/or the handle 110 material is medium-stiff/medium-hard on the rubber Durometer Scale, for example, has a Durometer measurement of D48. Additionally or alternatively, the handle 110 and/or the handle 110 material may be relatively crack-stress resistance and weather resistant.

In some embodiments, the handle 110 has an approximate length (from the first end 112 to the second end 114) of 5 cm to 30 cm (2 in to 12 in). Additionally or alternatively, the handle 110 has an approximate outer diameter and/or width of the handle 110 of 6 mm and 65 mm (0.25 in to 2.5 in). Additionally or alternatively, the passageway 118 extending through the handle 110 has an approximate diameter and/or width of 3 mm to 50 mm (0.12 in to 2.00 in).

FIG. 5 shows a detailed view of the fastener 120 component of the handle assembly 100. The fastener 120 includes a first connector 122 at one end of the fastener 120, a second connector 124 at the opposite end of the fastener, and an elongate body 126 extending between the first and second connectors 122, 124.

In some embodiments, as shown in FIG. 5, the first and second connectors 122, 124 are corresponding halves of a connector and are configured to fit, attach, and/or fasten together to form a closed, continuous loop with fastener 120. In some embodiments, the first connector 122 is a female half or portion of a connector and the second connector 124 is a corresponding male half or portion of a connector. For example, in some embodiments, the first and second connectors 122, 124 are two corresponding halves of a cable tie and/or tie wrap as shown in FIGS. 1, 2, and 5. Additionally or alternatively, the first and second connectors 122, 124 may be any suitable components, fasteners, and/or devices able to be connected together to form a loop with the elongate body 126 of the fastener 120.

In some embodiments, the fastener 120 is adjustable and able to accommodate a variety of shapes and sizes of handles 110, passageways 118, and/or structures 130. Additionally or alternatively, in some embodiments, the faster 120 is designed to fit a specific dimension or size of handles 110, passageways 118, and/or structures 130. In some embodiments, the fastener 120 may have no first and/or second connector 122, 124. For example, the fastener 120 may be a piece of rope, wire, and/or other device that can be secured to itself to form a loop with the fastener 120.

The fastener 120 material may be any material that strong enough to fixedly position the handle 110 on the structure 130 and support the weight of the structure 130 when carried or moved via the handle 110. In some embodiments, the fastener 120 material is a polymer. For example, the fastener 120 material may comprise polyethylene, polypropylene, polyurethane, nylon, and/or any other suitable polymer or other material that provides a strong connection to hold the handle 110 in place and support the weight of the structure 130. In some embodiments, the first and second connectors 122, 124 and/or the elongate body 126 of the fastener 120 are all the same material. Alternatively, the first and second connectors 122, 124 and/or the elongate body 126 may be different materials.

In some embodiments, the fastener 120 and/or fastener material has a loop tensile strength of approximately 54 kgs (120 lbs). The fastener 120 and/or fastener material is able to withstand temperatures in the range of −40° C. and 85° C. (−40° F. and 185° F.). Additionally or alternatively, fastener 120 and/or fastener material may have a maximum bundle diameter ratio of 6:89. The fastener 120 may be any size, width, and/or diameter capable of providing a secure connection for the handle 110 and structure 130. In some embodiments, the fastener 120 has an approximate width of 2 mm to 64 mm (0.09 in to 2.5 in).

Referring again to FIG. 2, the handle assembly 100 is shown installed on a structure 130. The structure 130 in FIG. 2 is shown as a bicycle frame, but in other embodiments, the structure 130 may be any suitable structure that handle assembly 100 may be installed on and used to lift, carry, and/or otherwise manipulate the structure 130. In some embodiments where the structure 130 is a bicycle frame, the first and second portions 132, 134 of the structure 130 are a down tube and a seat tube of the bicycle frame.

As shown in FIG. 2, in some embodiments, the first and second portions 132, 134 of the structure 130 form a V shape such that the distance between the portions 132, 134 decreases towards one end of the portions 132, 134, for example, forming an acute angle with the first and second potions 132, 134. The V shape may help keep the handle assembly 100 in place and fixedly connected to the structure 130. As shown in FIG. 2, the V shape of the structure 130 prevents the handle assembly 100 from sliding or moving downwards because the distance between the first and second portions 132, 134 progressively becomes smaller, eventually reaching a point where the distance between the portions 132, 134 is less than a length of the handle 110. Additionally or alternatively, the fastener 120 prevents the handle assembly 100 from sliding or moving upwards because once the first and second portions 122, 124 are connected, the fastener 120 forms a loop of a fixed length and cannot fit around an upper area of the structure 130 where the first and second portions 122, 124 are farther apart.

As shown in FIG. 2, the handle assembly 100 is installed between the down tube 132 and the seat tube 134. In the installed configuration shown in FIG. 2, the first end 112 of the handle 110 abuts the down tube 132, the second end 114 of the handle 110 abuts the seat tube 134, and the fastener 120 extends through the passageway 118 of the handle 110, wraps around the down tube 132, extends back through the passageway 118 a second time, and wraps around the seat tube 134, with the first and second connector portions 122, 124 connected to each other and adjusted to fit snugly against the seat tube 134. In other embodiments, the handle assembly 100 may be installed in another orientation between the down and seat tubes 132, 134, or between other portions, sections, and/or tubes of the bicycle frame 130.

Figure 6A:
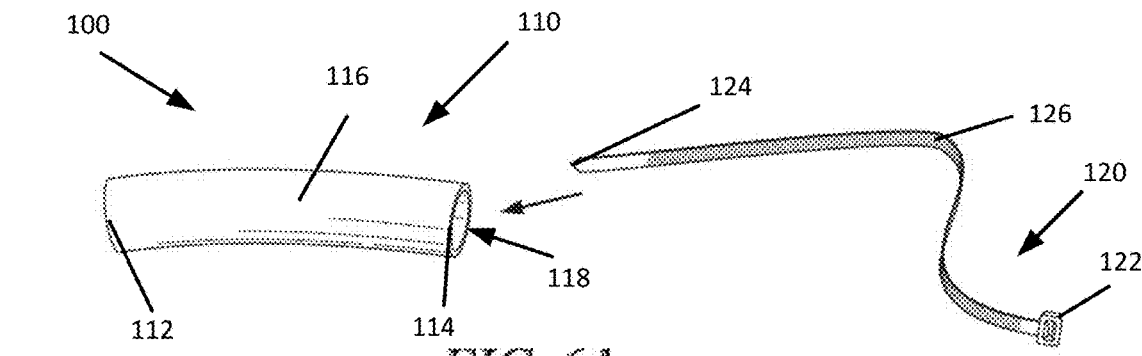
FIGS. 6A-6H illustrate an example of steps of maneuvering the components of the handle assembly of FIGS. 1-5 to install the handle assembly on a structure.
Figure 6B:
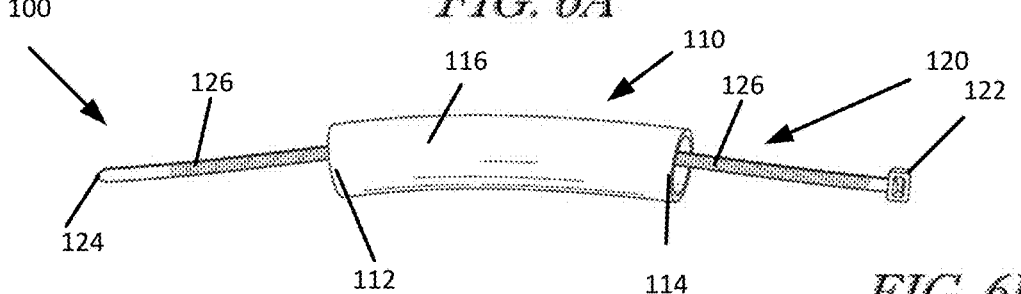

FIGS. 6A-6H and 7 illustrate installation steps of the handle assembly 100 and show a flow diagram of an example of method steps for maneuvering the components of the handle assembly 100 of FIGS. 1-5 to install the handle assembly 100 on the structure 130. FIG. 6A shows gathering the separate assembly 100 components, the handle 110 and the fastener 120, to prepare for assembly. FIG. 6B shows inserting and extending the elongate body 126 of the fastener 120 through the passageway 118 of the handle 110 from the first end 112 of the handle 110 to the second end 114 (710), or vice versa, such that the first connector 122 is at one end 112 of the handle 110 and the second connector 124 is at the opposite end 114 of the handle 110, with the elongate body 126 disposed in the passageway 118 and within the outer wall 116 of the handle 110.

Figure 6C:
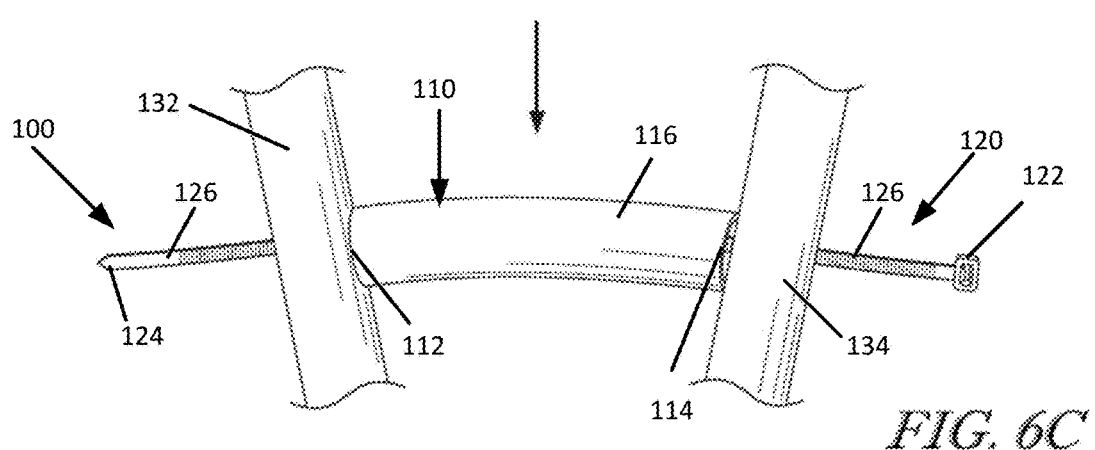

FIG. 6C shows positioning the handle 110 between the first and second portions 132, 134 of the structure 130 (720) at a point, for example, where the distance between the first and second portions 132, 134 is substantially equal to a length of the handle 110. As shown in FIG. 6C, in this position, the ends of the fastener 120 with the first and second connectors 122, 124 extend past the first and second portions 132, 134 at respective ends of the handle 110. In some embodiments, as shown in FIG. 2, the ends of the fastener 120 are both disposed on the same side of the structure 130 such that the fastener 120 does not cross through an opening formed between the first and second portions 132, 134. In some embodiments, the fastener 120 does cross through an opening formed between the first and second portions 132, 134.

Figure 6D:
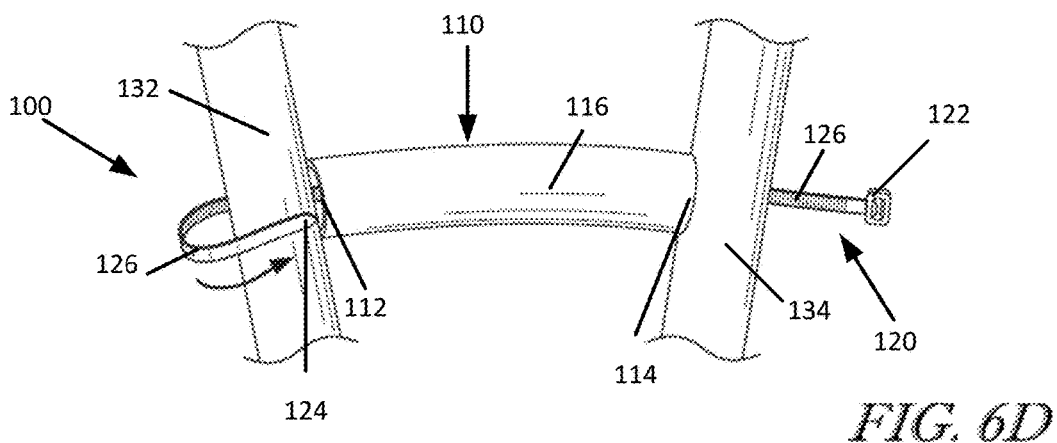
Figure 6E:
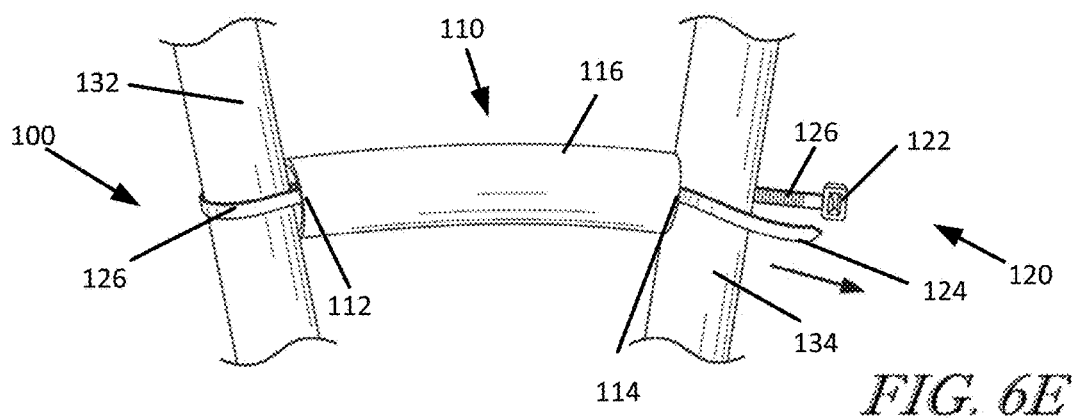
Figure 6F:
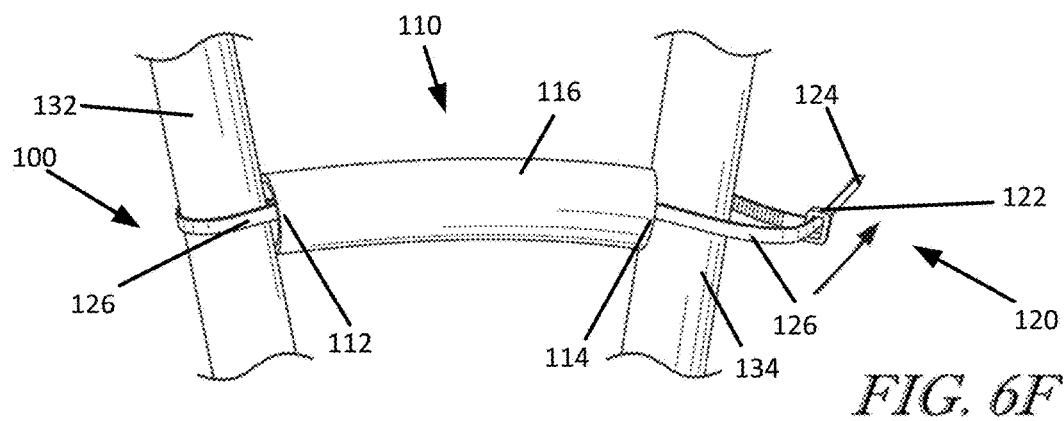

FIG. 6D shows at least partially wrapping an end of the fastener 120 around the first portion 132 of the structure 134 (730) such that the fastener 120 at least partially surrounds the first portion 132. As shown in FIG. 6D, in some embodiments, the first portion 132 is encompassed by the fastener 120 and the handle 110. FIGS. 6E-6F show inserting and/or feeding the fastener 120 back through the passageway 118 of the handle 110 (740) and at least partially wrapping the fastener 120 around the other portion 134 of the structure 130 (750). As shown in FIG. 6E, in some embodiments, the fastener 120 is fed back through the handle 110 from the first end 112 to the second send 114, where the first end 112 is abutting the portion 132 of the structure 130 now at least partially surrounded by the elongate body 126 of the fastener 120.

In some embodiments, the elongate body 126 of the fastener extends substantially parallel to itself through the passageway 118 of the handle 110, such that the fastener 120 forms a U shape at either end of the handle 110 with the bottom of the U shape wrapped around either portion 132, 134 of the structure 130, and the upper parallel portions of the U shape extending through the handle 110. In other embodiments, the fastener 120 may form a figure-8 shape, where the loops of the figure-8 wrap around either portion 132, 134 of the structure 130 and the fastener 120 crosses itself within the passageway 118 of the handle 110 between the first and second portions 132, 134.

Figure 6G:
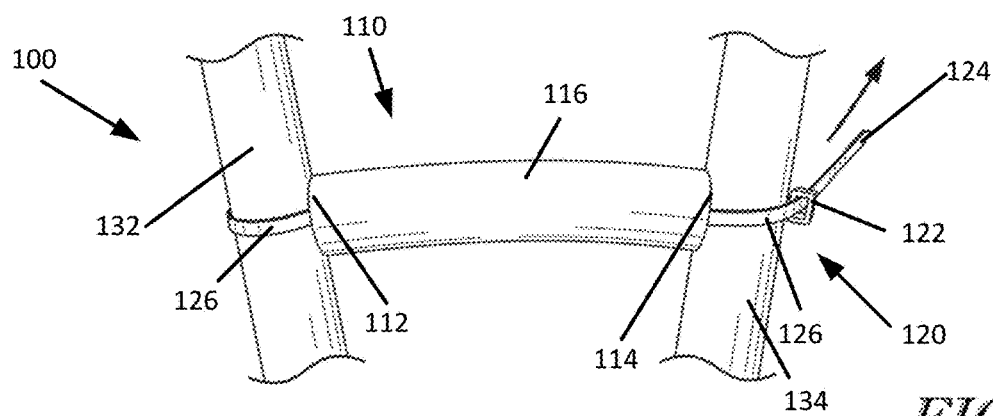

FIGS. 6F and 6G show connecting the first and second connectors 122, 124 of the fastener 120 to form a continuous loop with the fastener 120 (760) that wraps at least partially around both portions 132, 134 of the structure 130 and extends through the handle 110. In some embodiments, as shown in FIGS. 6F and 6G, the fastener 120 is a cable tie, and the male portion 124 of the cable tie is fed through the female portion 122 of the cable tie.

Figure 6H:
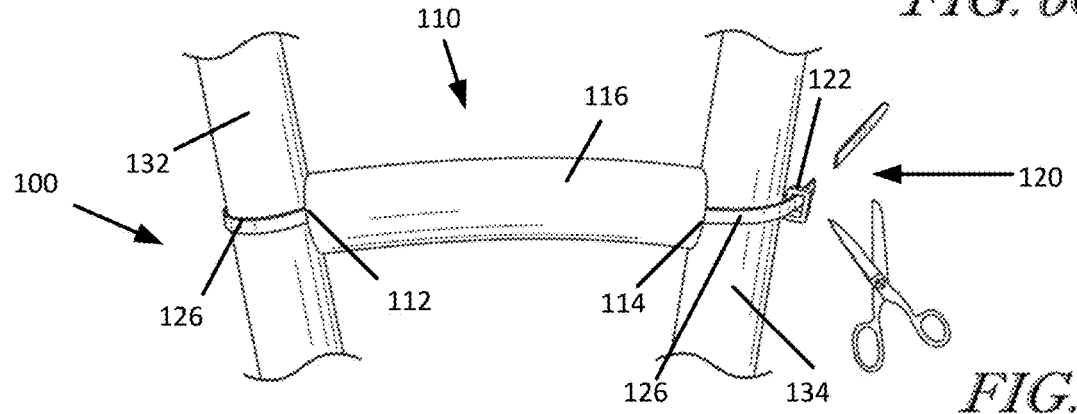

FIG. 6G further shows the fastener 120 being fastened and/or connected such that the handle 110 is held fixed and/or securely in place on the structure 130 (770) with the fastener 120 and/or shape of the structure 130. In some embodiments, as shown in FIG. 6G where the fastener 120 is, for example, a cable tie, the male portion 124 is pulled tight through the female portion 122 to place the fastener 120 in tension such that there is substantially no excess or slop in the fastener 120 and/or handle assembly 100, and the handle 110 is held securely in place with no or very little movement possible relative to the structure. In some embodiments, as shown in FIG. 6H, any excess portion of the fastener 120 may be trimmed or cut off so as to not catch on any objects during movement of the structure 130.

Each component may include additional, different, or fewer components. For example, in some embodiments, the fastener 120 may include additional connectors 122, 124 and/or bodies 126. Additionally or alternatively, the handle 110 may include additional components such as grip features, more or less passageways 118, etc. Additionally or alternatively, the assembly 100 may be implemented with additional, different, or fewer components. For example, the handle assembly 100 may include additional fasteners 120 or different components. Additionally or alternatively, the logic illustrated in the flow diagrams may include additional, different, or fewer operations than illustrated. The operations illustrated may be performed in an order different than illustrated.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The following numbered clauses include embodiments that are contemplated and non-limiting:

Clause 1. A handle assembly includes a handle and a fastener.

Clause 2. The handle assembly of clause 1, any other clause, or any suitable combination of clauses, wherein the handle includes a first end, a second end opposite the first end, and a passageway extending a length of the handle between the first end and the second end.

Clause 3. The handle assembly of clause 2, any other clause, or any suitable combination of clauses, wherein the fastener includes a first connector, a second connector, and an elongate body extending between the first connector and the second connector.

Clause 4. The handle assembly of clause 3, any other clause, or any suitable combination of clauses, wherein the elongate body of the fastener is configured to at least partially surround a first portion of a structure disposed near the first end of the handle, extend through the passageway of the handle, and at least partially surround a second portion of the structure disposed near the second end of the handle.

Clause 5. The handle assembly of clause 4, any other clause, or any suitable combination of clauses, wherein the fastener is configured to form a continuous loop by connecting the first connector to the second connector near at least one of the first end or the second end of the handle to fixedly positon the handle between the first portion of the structure and the second portion of the structure.

Clause 6. The handle assembly of clause 5, any other clause, or any suitable combination of clauses, wherein the wherein the structure is a V-shaped structure.

Clause 7. The handle assembly of clause 6, any other clause, or any suitable combination of clauses, wherein an end of the first portion of the structure and an end of the second portion of the structure converge and meet to form a V portion of the V-shaped structure.

Clause 8. The handle assembly of clause 5, any other clause, or any suitable combination of clauses, wherein a rigidness and tolerance of the handle assembly is configured to quickly affect movement of the structure based on movement of the handle assemble without lag.

Clause 9. The handle assembly of clause 5, any other clause, or any suitable combination of clauses, wherein a body of the handle is cylindrical in shape, the passageway extending along an axis extending through a center of the handle and along the length of the handle.

Clause 10. The handle assembly of clause 5, any other clause, or any suitable combination of clauses, wherein the length of the handle is between 2 and 12 inches, and a diameter of the handle is between 0.25 and 2.5 inches.

Clause 11. The handle assembly of clause 5, any other clause, or any suitable combination of clauses, wherein the elongate body of the fastener extends substantially parallel to itself within the handle between the first portion of the structure and the second portion of the structure.

Clause 12. The handle assembly of clause 5, any other clause, or any suitable combination of clauses, wherein a material of the handle is a polymer.

Clause 13. The handle assembly of clause 12, any other clause, or any suitable combination of clauses, wherein the material for the handle comprises at least one of polyethylene, polypropylene, polyurethane, or nylon.

Clause 14. The handle assembly of clause 5, any other clause, or any suitable combination of clauses, wherein a material of the fastener is a polymer.

Clause 15. The handle assembly of clause 14, any other clause, or any suitable combination of clauses, wherein the material for the fastener comprises at least one of polyethylene, polypropylene, polyurethane, or nylon.

Clause 16. The handle assembly of clause 5, any other clause, or any suitable combination of clauses, wherein the first connector is a male portion of the fastener and the second connector is a female portion of the fastener, the fastener configured to form the continuous loop by inserting the male portion into the female portion.

Clause 17. The handle assembly of clause 16, any other clause, or any suitable combination of clauses, wherein the fastener is a zip tie.

Clause 18. The handle assembly of clause 5, any other clause, or any suitable combination of clauses, wherein a width of fastener is between 0.09 inches and 2.5 inches and a diameter of passageway is between 0.12 inches and 2.00 inches.

Clause 19. The handle assembly of clause 5, any other clause, or any suitable combination of clauses, wherein the fastener is configured to support the handle and a weight of the structure when the structure is lifted with the handle.

Clause 20. The handle assembly of clause 19, any other clause, or any suitable combination of clauses, wherein a shape of the fastener is configured to help the handle maintain a shape and a structure of the handle when the handle is fastened to the structure.

Clause 21. The handle assembly of clause 5, any other clause, or any suitable combination of clauses, wherein the structure is a bicycle.

Clause 22. The handle assembly of clause 21, any other clause, or any suitable combination of clauses, wherein the structure includes a down tube, a seat tube, and a top tube, the handle extending between the seat tube and the down tube.

Clause 23. The handle assembly of clause 5, any other clause, or any suitable combination of clauses, wherein a width of the handle is smaller than diameter of the structure.

Clause 24. The handle assembly of clause 5, any other clause, or any suitable combination of clauses, wherein the fastener curves around both portions of the structure such that the fastener is in contact with the structure at both ends of the handle.

Clause 25. The handle assembly of clause 5, any other clause, or any suitable combination of clauses, wherein the handle abuts the structure at both ends of the handle.

Clause 26. A method of installing a handle assembly includes extending an elongate body of a fastener through a passageway of a handle between a first end of the handle and a second end of the handle, the fastener including a first connector disposed at a first end of the fastener and a second connector disposed at a second end of the fastener, the elongate body extending between the first connector and the second connector.

Clause 27. The method of clause 26, any other clause, or any suitable combination of clauses, wherein the method includes positioning the handle and the fastener between a first portion of a structure and a second portion of the structure, the first end of the handle and the first end of the fastener disposed near the first portion of the structure and the second end of the handle and the second end of the fastener disposed near the second portion of the structure.

Clause 28. The method of clause 27, any other clause, or any suitable combination of clauses, wherein the method includes at least partially wrapping the elongate body around the first portion of the structure.

Clause 29. The method of clause 28, any other clause, or any suitable combination of clauses, wherein the method includes feeding the first end of the fastener through the passageway of the handle from the first end of the handle to the second end of the handle.

Clause 30. The method of clause 29, any other clause, or any suitable combination of clauses, wherein the method includes at least partially wrapping the elongate body around the second portion of the structure.

Clause 31. The method of clause 30, any other clause, or any suitable combination of clauses, wherein the method includes forming a continuous loop with the fastener by connecting the first connector and the second connector near the second portion of the structure.

Clause 32. The method of clause 31, any other clause, or any suitable combination of clauses, wherein the method includes securing the handle to the structure between the first portion and the second portion with the fastener.

Clause 33. The method of clause 32, any other clause, or any suitable combination of clauses, wherein positioning the handle and the fastener between a first portion of a structure and a second portion of the structure comprises positioning the handle at a location where the distance between the first portion and the second portion is substantially equal to a length of the handle.

Clause 34. The method of clause 32, any other clause, or any suitable combination of clauses, further comprising lifting the structure via the handle.

Clause 35. The method of clause 32, any other clause, or any suitable combination of clauses, wherein feeding the first end of the fastener through the passageway of the handle from the first end of the handle to the second end of the handle comprises extending the fastener through the passageway parallel to itself.

Clause 36. The method of clause 32, any other clause, or any suitable combination of clauses, wherein feeding the first end of the fastener through the passageway of the handle from the first end of the handle to the second end of the handle comprises extending the fastener through the passageway across itself.

Clause 37. The method of clause 32, any other clause, or any suitable combination of clauses, wherein forming a continuous loop with the fastener by connecting the first connector and the second connector near the second portion of the structure comprises feeding the second connector through the first connector.

Clause 38. The method of clause 32, any other clause, or any suitable combination of clauses, wherein securing the handle to the structure between the first portion and the second portion with the fastener comprises adjusting the fastener to remove any gaps between the structure, the handle, and the fastener.

Clause 39. A handle assembly includes a handle and a fastener.

Clause 40. The handle assembly of clause 39, any other clause, or any suitable combination of clauses, wherein the handle includes a first end, a second end opposite the first end, and a passageway extending a length of the handle between the first end and the second end.

Clause 41. The handle assembly of clause 40, any other clause, or any suitable combination of clauses, wherein the fastener includes a first connector, a second connector, and an elongate body extending between the first connector and the second connector.

Clause 42. The handle assembly of clause 41, any other clause, or any suitable combination of clauses, wherein the elongate body of the fastener is configured to at least partially surround a first portion of a V-shaped structure disposed near the first end of the handle, extend through the passageway of the handle, and at least partially surround a second portion of the V-shaped structure disposed near the second end of the handle.

Clause 43. The handle assembly of clause 42, any other clause, or any suitable combination of clauses, wherein the fastener is configured to form a continuous loop by connecting the first connector to the second connector near at least one of the first end or the second end of the handle to fixedly positon the handle between the first portion of the V-shaped structure and the second portion of the V-shaped structure.

Clause 44. The handle assembly of clause 43, any other clause, or any suitable combination of clauses, wherein the handle is held in place by a shape of the V-shaped structure and a fixed dimension of the continuous loop formed by the elongate body.

Clause 45. The handle assembly of clause 44, any other clause, or any suitable combination of clauses, wherein an end of the first portion of the structure and an end of the second portion of the structure converge and meet to form a V portion of the V-shaped structure.

Clause 46. The handle assembly of clause 44, any other clause, or any suitable combination of clauses, wherein the elongate body of the fastener extends substantially parallel to itself within the handle between the first portion of the structure and the second portion of the structure.

Clause 47. The handle assembly of clause 44, any other clause, or any suitable combination of clauses, wherein the elongate body of the fastener crosses over itself within the handle between the first portion of the structure and the second portion of the structure.

Clause 48. The handle assembly of clause 44, any other clause, or any suitable combination of clauses, wherein the material for the handle comprises at least one of polyethylene, polypropylene, polyurethane, or nylon.

Clause 49. The handle assembly of clause 44, any other clause, or any suitable combination of clauses, wherein the material for the fastener comprises at least one of polyethylene, polypropylene, polyurethane, or nylon.

Clause 50. The handle assembly of clause 44, any other clause, or any suitable combination of clauses, wherein the first connector is a male portion of the fastener and the second connector is a female portion of the fastener, the fastener configured to form and adjust a size of the continuous loop by inserting the male portion into the female portion.

Clause 51. The handle assembly of clause 44, any other clause, or any suitable combination of clauses, wherein the structure includes a down tube, a seat tube, and a top tube, the handle extending between the seat tube and the down tube.

In addition to the features mentioned in each of the independent aspects enumerated above, some examples may show, alone or in combination, the optional features mentioned in the dependent aspects and/or as disclosed in the description above and shown in the figures.

What is claimed is:

1. A handle assembly comprising:
   a handle including a first end, a second end opposite the first end, and a passageway extending a length of the handle between the first end and the second end; and
   a cable tie including a first connector, a second connector, and an elongate body extending between the first connector and the second connector;
   wherein the elongate body of the cable tie is configured to at least partially surround a first portion of a structure disposed near the first end of the handle, extend through the passageway of the handle, and at least partially surround a second portion of the structure disposed near the second end of the handle, and wherein the cable tie is configured to form a continuous loop by connecting the first connector to the second connector near at least one of the first end or the second end of the handle to fixedly position the handle between the first portion of the structure and the second portion of the structure.

2. The handle assembly of claim 1, wherein the structure is a V-shaped structure.

3. The handle assembly of claim 1, wherein a rigidness and tolerance of the handle assembly is configured to quickly affect movement of the structure based on movement of the handle assemble without lag.

4. The handle assembly of claim 1, wherein a body of the handle is cylindrical in shape, the passageway extending along an axis extending through a center of the handle and along the length of the handle.

5. The handle assembly of claim 1, wherein the elongate body of the cable tie extends substantially parallel to itself within the handle between the first portion of the structure and the second portion of the structure.

6. The handle assembly of claim 1, wherein a material of the handle is a polymer.

7. The handle assembly of claim 6, wherein the material for the handle comprises at least one of polyethylene, polypropylene, polyurethane, or nylon.

8. The handle assembly of claim 1, wherein a material of the cable tie is a polymer.

9. The handle assembly of claim 1, wherein the first connector is a male portion of the cable tie and the second connector is a female portion of the cable tie, the cable tie configured to form the continuous loop by inserting the male portion into the female portion.

10. The handle assembly of claim 1, wherein the cable tie is configured to support the handle and a weight of the structure when the structure is lifted with the handle.

11. The handle assembly of claim 10, wherein a shape of the cable tie is configured to help the handle maintain a shape and a structure of the handle when the handle is fastened to the structure.

12. The handle assembly of claim 1, wherein the structure is a bicycle.

13. The handle assembly of claim 12, wherein the structure includes a down tube, a seat tube, and a top tube, the handle extending between the seat tube and the down tube.

14. The handle assembly of claim 1, wherein the handle abuts the structure at both ends of the handle.

15. A method of installing a handle assembly comprising:
    extending an elongate body of a cable tie through a passageway of a handle between a first end of the handle and a second end of the handle, the cable tie including a first connector disposed at a first end of the cable tie and a second connector disposed at a second end of the cable tie, the elongate body extending between the first connector and the second connector;
    positioning the handle and the cable tie between a first portion of a structure and a second portion of the structure, the first end of the handle and the first end of the cable tie disposed near the first portion of the structure and the second end of the handle and the second end of the cable tie disposed near the second portion of the structure;
    at least partially wrapping the elongate body around the first portion of the structure;
    feeding the first end of the cable tie through the passageway of the handle from the first end of the handle to the second end of the handle;
    at least partially wrapping the elongate body around the second portion of the structure;
    forming a continuous loop with the cable tie by connecting the first connector and the second connector near the second portion of the structure; and
    securing the handle to the structure between the first portion and the second portion with the cable tie.

16. The method of claim 15, wherein positioning the handle and the cable tie between a first portion of a structure and a second portion of the structure comprises positioning the handle at a location where the distance between the first portion and the second portion is substantially equal to a length of the handle.

17. The method of claim 15, wherein forming a continuous loop with the cable tie by connecting the first connector and the second connector near the second portion of the structure comprises feeding the second connector through the first connector.

18. The method of claim 15, wherein securing the handle to the structure between the first portion and the second portion with the cable tie comprises adjusting the cable tie to remove any gaps between the structure, the handle, and the cable tie.

19. The method of claim 15, wherein the first connector is a male portion of the cable tie and the second connector is a female portion of the cable tie, the step of forming a continuous loop with the cable tie by connecting the first connector and the second connector includes inserting the male portion into the female portion.

20. A handle assembly comprising:
- a handle including a first end, a second end opposite the first end, and a passageway extending a length of the handle between the first end and the second end; and
- a cable tie including a first connector, a second connector, and an elongate body extending between the first connector and the second connector,
- wherein the elongate body of the cable tie is configured to at least partially surround a first portion of a V-shaped structure disposed near the first end of the handle, extend through the passageway of the handle, and at least partially surround a second portion of the V-shaped structure disposed near the second end of the handle, and wherein the cable tie is configured to form a continuous loop by connecting the first connector to the second connector near at least one of the first end or the second end of the handle to fixedly positon the handle between the first portion of the V-shaped structure and the second portion of the V-shaped structure, the handle held in place by a shape of the V-shaped structure and a fixed dimension of the continuous loop formed by the elongate body.

* * * * *